United States Patent
Mikhail et al.

(10) Patent No.: US 6,726,439 B2
(45) Date of Patent: Apr. 27, 2004

(54) RETRACTABLE ROTOR BLADES FOR POWER GENERATING WIND AND OCEAN CURRENT TURBINES AND MEANS FOR OPERATING BELOW SET ROTOR TORQUE LIMITS

(75) Inventors: Amir S. Mikhail, Santa Barbara, CA (US); Geoffrey F. Deane, Santa Barbara, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 94 days.

(21) Appl. No.: 10/039,825

(22) Filed: Oct. 25, 2001

(65) Prior Publication Data

US 2003/0044274 A1 Mar. 6, 2003

Related U.S. Application Data (60) Provisional application No. 60/313,725, filed on Aug. 22, 2001.

(51) Int. Cl.[7] .................................................. F03D 7/04
(52) U.S. Cl. ........................... 415/4.1; 415/905; 416/1; 416/37; 416/89; 416/88
(58) Field of Search ................................. 415/905, 908, 415/4.1; 416/1, 36, 37, 89, 88, 87

(56) References Cited

U.S. PATENT DOCUMENTS

| | | |
|---|---|---|
| 2,108,245 A | 2/1938 | Ash, Jr. |
| 2,163,482 A | 6/1939 | Cameron |
| 2,979,288 A | 4/1961 | Klein |
| 3,249,160 A | 5/1966 | Messerschmitt |
| 3,606,571 A | 9/1971 | Wood |
| 3,814,351 A | 6/1974 | Bielawa |
| 4,074,952 A | 2/1978 | Fradenburgh et al. |
| 4,080,097 A | 3/1978 | Hager et al. |
| 4,139,330 A | 2/1979 | Neal |
| 4,180,372 A | 12/1979 | Lippert, Jr. |
| 4,710,101 A | 12/1987 | Jamieson |
| 5,253,979 A | 10/1993 | Fradenburgh et al. |
| 5,299,912 A | 4/1994 | Fradenburgh et al. |
| 5,310,314 A | 5/1994 | Bastedo et al. |
| 5,620,303 A | 4/1997 | Moffitt et al. |
| 5,620,304 A | 4/1997 | Matsuka et al. |
| 5,630,705 A | 5/1997 | Eikelenboom |
| 5,636,969 A | 6/1997 | Matuska et al. |
| 5,642,982 A | 7/1997 | Matuska et al. |
| 5,655,879 A | 8/1997 | Kiely et al. |
| 5,735,670 A | 4/1998 | Moffitt et al. |
| 6,019,578 A | 2/2000 | Hager et al. |
| 6,030,177 A | 2/2000 | Hager |
| 6,398,497 B1 | 6/2002 | Federici et al. |

*Primary Examiner*—Edward K. Look
*Assistant Examiner*—Kimya N. McCoy
(74) *Attorney, Agent, or Firm*—Owen L. Lamb (57) ABSTRACT

A wind or water flow energy converter comprising a wind or water flow actuated rotor assembly. The rotor comprises a plurality of blades, wherein the blades of are variable in length to provide a variable diameter rotor. The rotor diameter is controlled to fully extend the rotor at low flow velocity and to retract the rotor as flow velocity increases such that the loads delivered by or exerted upon the rotor do not exceed set limits.

24 Claims, 9 Drawing Sheets

RETRACTABLE ROTOR BLADES FOR POWER GENERATING WIND AND OCEAN CURRENT TURBINES AND MEANS FOR OPERATING BELOW SET ROTOR TORQUE LIMITS

CROSS-REFERENCE TO RELATED APPLICATIONS

The invention herein was disclosed in U.S. Disclosure Document #483,912 filed on Dec. 11, 2000, and claims priority of U.S. Provisional Patent Application No. 60/313,725 filed Aug. 22, 2001, both of which are incorporated herein by reference.

BACKGROUND OF THE INVENTION

1. Field of the Invention

This invention relates to electric power-generating devices, such as wind turbines and ocean current turbines, and more particularly to a method and apparatus for controlling extendable rotors of wind or water turbines.

2. Description of the Prior Art

Rotating variable span airfoils have been in development for the past 20 years by the aerospace industry for use in helicopters and Vertical Take Off and Landing (VTOL) aircraft Extendable rotor blades in rotating equipment, of which wind turbines are a subset, have been known in the art since the 1930's (Cameron U.S. Pat. No. 2,163,482 and Ash U.S. Pat. No. 2,108,245). Numerous specific mechanical designs have been shown, such as the torque tube and spar assembly for a screw-driven extendable rotor blade (U.S. Pat. No. 5,636,969), the mounting arrangement for variable diameter rotor assemblies (U.S. Pat. No. 5,655,879), the variable diameter rotor blade actuation system using retention straps wound around a centrally actuated drum (U.S. Pat. Nos. 5,642,982 and 6,019,578), a locking mechanism and safety stop against over extension for a variable diameter rotor (U.S. Pat. No. 4,080,097), a variable diameter rotor with an offset twist (U.S. Pat. No. 5,253,979), a drive system for changing the diameter of a variable diameter rotor using right angle gears to interface with screw driven retraction mechanism (U.S. Pat. No. 5,299,912), as well as several others (U.S. Pat. Nos. 5,620,303; 6,030,177; 5,735,670; 5,655,879). In all cases, the prior art presents mechanisms for use as components of extendable rotor blade systems that either are parts of rotating aircraft equipment for helicopters or airplanes, or are described in more general terms as apparatus for use with any extendable rotor system.

U.S. Pat. No. 4,710,101, to Jamieson, granted Dec. 1, 1987, entitled "Wind Turbine" discloses a conventional, horizontal axis, axial flow wind turbine for use in a wind turbine electrical generator set wherein an electrical generator is connected to the turbine for generation electrical energy.

Referring to FIG. 1 of Jamieson, the wind turbine comprises a conventional tower structure 10 that is stationary with reference to the wind flow. The tower has a rotatable head 11 upon which is mounted a rotor 12. The head is brought upwind by a vane 13 such that the rotor is in alignment with wind flow direction.

A movable nose portion 16 is located at or adjacent the leading edge of the blade and at or adjacent the tip of the blade. The nose portion is displaceable longitudinally of the blade, i.e. radially outwardly of the blade, from a normal retracted position. This moveable portion contributes to the lift of the arifoil section, and is moved to an advanced position in which drag is produced, to prevent unwanted increase in the speed of the rotation of the rotor.

U.S. Pat. No. 4,108,372, to Lippert, et. al, granted Dec. 25, 1979, entitled "Wind Rotor Automatic Air Brake" also discloses a conventional, horizontal axis, axial flow wind turbine for use in a wind turbine electrical generator set wherein an electrical generator is connected to the turbine for generating electrical energy.

Referring to FIG. 1 of Lippert, et al, the wind turbine comprises a conventional tower structure 24 that is stationary with reference to the wind flow. The tower has a pivot arrangement 26 upon which is mounted a rotor 12.

An air brake 10 of the invention is mounted on the tips 12 of the blades 14 of the rotor 16. The rotor of the windmill is mounted on an output shaft 20, which is journaled in suitable bearings for rotation in the nose of a nacelle 22. Nacelle 22 is mounted on a tower 24 by means of the usual pivot arrangement 26, which allows the windmill to weathercock freely into the wind in alignment with wind flow direction. A suitable power train (not shown) converts the energy output of the rotor in a form suitable for utilization, such as an electrical generator connected for generating electrical energy.

Lippert, Jr. discloses a spring-loaded pivoting end plate braking mechanism 10 for a wind rotor. The end plate is hinged such that it is deployed by centrifugal force of a speed change detetced by a sensor whcih controls an actuator to effect the required positioning of the brake plate into the air stream. The break plate acts as an aerodynamic brake for wind turbines in over-speed conditions.

The prior art does not describe extendable rotor blade systems for wind or ocean current turbines combined with control of the loads they encounter.

The prior art shows rotor systems which operate within four regions: (1) at velocities below cut-in, (2) over a range of intermediate velocities which yield varying power production, (3) at higher velocities in which the turbines produce constant or slightly decreasing power in order to limit loads, and (4) at extremely high velocities in which the turbines cut-out. No prior art indicates operation within a fifth region in which rotor diameter is varied to maintain operation within a specified loads regime.

What is needed is a method of controlling wind or ocean current turbines in a way that increases energy production while constraining torque, thrust, or other loads below some level that is less than the loads that would be found if the rotor were allowed to produce peak system power while the rotors were fully extended, at all wind conditions from cut-in to cut-out wind speeds.

SUMMARY OF THE INVENTION

Briefly, the present invention relates to controlling an extendable rotor blade used in power generation equipment driven by slow moving fluids such as wind and water. The extendable rotor may consist of a number of general configurations. In one configuration, an airfoil with a span less than the outer radius of the turbine is controllably maneuvered outwards and inwards from the center of rotation along a load-bearing shaft, increasing and reducing the area swept by the airfoil during rotor revolution. In another configuration, the rotor consists of two main pieces: the main blade, and a blade extension.

As components of the turbine as a whole, these configurations present four major design variables: minimum rotor diameter (with the extension fully retracted), maximum rotor diameter (with the extension fully extended), the rated system power, and the rated system torque. Of slightly lesser interest, but of significance in isolated design cases as a limiting factor instead of the torque, are the rated system thrust (rotor drag) and blade root bending.

In accordance with an aspect of the invention, the mechanical torque (or thrust) delivered by the rotor is controlled such that the torque (or thrust) is limited to below a threshold value. An advantage of the invention is that it enables an extended rotor blade configuration to operate within adjustable torque and thrust load limits. This enables adaptation to a multitude of wind turbine powertrain manufacturers' designs or to a variety of operating conditions through use of different control set points, and similarly enables retrofit of existing installed wind turbines.

Another advantage of the invention is that extendable blades offer the ability to enlarge or reduce the area swept by the blades, thereby increasing or decreasing the power capture for a given wind or ocean current velocity. Because the area swept by the rotor is proportional to the blades' radius squared, small changes induced in the rotor radius (through extension or retraction of blade extensions) result in large changes in power capture. For example, a 25% increase in rotor radius results in a 56% increase in swept area. In addition, because wind or ocean currents may be intermittent, the turbines may operate for a significant portion of time in flows with velocities less than required to reach rated power output. A turbine capable of extending its swept area in low velocity periods could then significantly increase the energy generated during these times compared to a non-extendable rotor turbine, which also results in reduction of power output variability (intermittency).

An advantage of the present invention is that it provides an approach to turbine control that increases the value of power generating equipment with only limited additional cost.

The invention allows the rotor to yield significant increases in power capture through increase of its swept area, without any penalty in rotor torque or thrust loads delivered to the powertrain or the connected structures. This method is applicable to rotors either having blades that feather or having stall regulated airfoils.

BRIEF DESCRIPTION OF THE DRAWINGS

The invention will be described in detail with reference to the drawings in which.

DESCRIPTION OF THE PREFERRED EMBODIMENTS

Power capture from wind and ocean current turbines is directly proportional to the cross-sectional area swept by the turbine's rotor blades. Conventional rotors utilize blades of fixed length, joined and rotating about a hub. These blades may be variable pitch (selectively rotatable about their longitudinal axes) in order to alter the angle of attack relative to the incoming fluid flow, principally for power shedding in high flow velocities. Alternatively, these blades may be fixed pitch or stall-regulated, wherein blade lift and therefore power capture falls off dramatically as wind speeds exceed some nominal value. Both variable pitch and stall regulated rotor blades with fixed diameters are well known in the art.

Figure 1A:
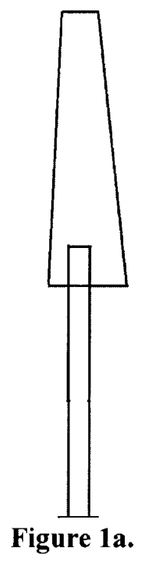
FIGS. 1a–1e illustrate cut-away side views of the preferred embodiments of the present invention.
Figure 1B:
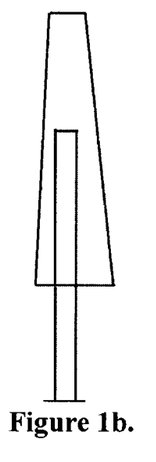
Figure 1C:
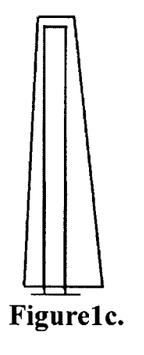
Figure 1D:
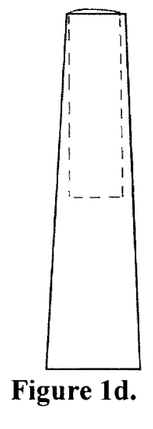
Figure 1E:
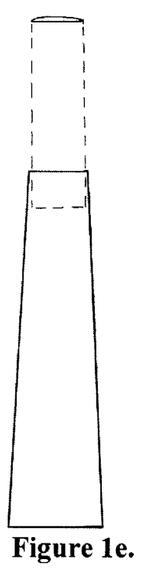

The extendable rotor discussed in this invention may consist of a number of general configurations. In one configuration, an airfoil with a span less than the outer radius of the turbine rotor (see FIGS. 1a–1c) is controllably maneuvered outwards and inwards from the center of rotation along a load-bearing shaft, increasing and reducing the area swept by the airfoil during rotor revolution. In another configuration, the rotor consists of two main pieces (see FIGS. 1d–1e): the main blade, and the blade extension (shown by broken lines). As components of the turbine as a whole, these configurations present four major design variables: minimum rotor diameter (FIGS. 1c and 1d with the extension fully retracted), maximum rotor diameter (FIGS. 1a and 1e with the extension fully extended), the rated system power, and the rated system loads, such as input shaft torque, rotor thrust, blade bending stress, blade lead-lag bending, flap bending or some other limiting load.

An aspect of this invention is a method of controllably limiting the mechanical loads, such as torque, thrust, blade lead-lag (in-plane), blade flap (out of plane), or tower top bending loads, delivered by the rotor to below a threshold value. Achieving this goal enables a single extended rotor blade configuration to operate within adjustable load limits. This enables adaptation to a multitude of wind turbine powertrain manufacturers' designs and to a variety of environmental conditions through use of different control set points, and similarly enables retrofit of existing installed wind turbines.

One characteristic of wind and ocean current turbines is that rotational speed of the turbine rotor is limited by the speed of the blade tip at the outer radius of the blade. When rotor tip speeds exceed roughly 65 m/s in a wind turbine, noise production tends to increase markedly. Therefore, at wind speeds above approximately 5–14 m/s, large diameter wind turbines' rotational velocities are determined by tip speed limitations and not by optimal power capture speeds.

This is significant because of its direct impact on delivered torque, a major cost driver in turbine powertrains. The torque ($\tau$) delivered by the rotor to the powertrain is given by $$\tau = P/\omega \qquad (1)$$

Where P is power and $\omega$ is rotor angular velocity. When the angular velocity is limited by tip speed ($V_{tip}$), the torque can be shown to be related to the rotor radius, r, as $$\tau = Pr/V_{np} \qquad (2)$$

Going one step further, if we desire to hold torque below a set design limit, $\tau_{lim}$, then the maximum power the rotor can produce while remaining within the tip speed and torque limit can be seen to be inversely proportional to the rotor radius, as given by $$P_{max} = \tau_{hm} V_{np}/r \quad (3)$$

Then, if we observe that power for a given wind speed (v) and density ρ is given as $$P = \frac{1}{2} \rho (\pi r^2) v^3 C_p \quad (4)$$

The relationship between rotor radius and wind velocity can be shown to be $$r = \frac{1}{v} \sqrt[3]{\frac{2\tau_{Lim} V_{tip}}{\rho \pi C_p}} \quad (5)$$

Where $C_p$ is the power capture efficiency of a given rotor geometry at the specified rotor angular velocity and wind speed. This means that as wind speed increases, the rotor radius must decrease nearly as the inverse of this increase ($C_p$ may vary slightly as this occurs) in order to stay within torque limitations. However, in practice a wind turbine will measure its power output (via electrical current for instance) and rotor RPM, and therefore may determine the appropriate radius by $$r = \frac{\tau_{Lim} V_{tip} \eta_p}{P} \quad (6)$$

Where $\eta_p$ is the approximate powertrain efficiency at a given observed output power, P.

The thrust load ($F_t$) is calculated as $$F_t = \frac{1}{2} \rho \pi r^2 v^2 C_t \quad (7)$$

Where $C_t$ is the rotor thrust coefficient at a given flow velocity, rotor rpm and blade pitch angle. If the thrust is held below a nominal limit ($F_{t,\,lim}$), then the rotor radius can be seen to vary as $$r = \frac{1}{v} \sqrt{\frac{2 F_{t,lim}}{\rho \pi C_t}} \quad (8)$$

Where rotor radius must decrease nearly as the inverse of an increase in velocity, similarly to Eq. 5.

Figure 2:
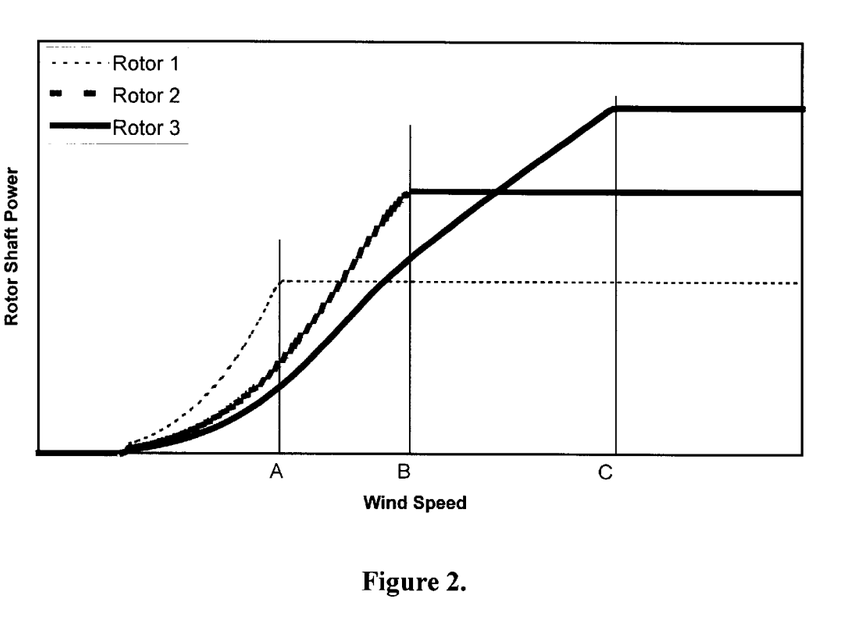
FIG. 2 illustrates possible wind turbine power curves, plotting rotor power capture versus wind speed, for three different rotor diameters, with rotor 1 representing the largest diameter and rotor 3 the smallest diameter
Figure 3:
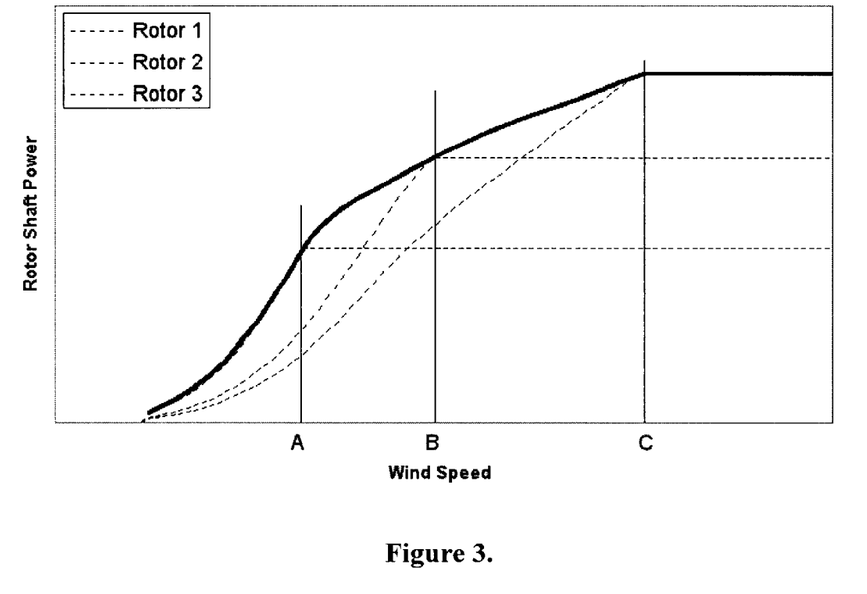
FIG. 3 illustrates the power curve followed by an extendable rotor blade system when controlled in accordance the present invention.

Another way to examine equations 5, 6 and 8 is to say that as rotor blades become larger in diameter, they reach specified loads limits at a lower wind velocity. FIG. 2 illustrates possible wind turbine power curves, plotting rotor power capture versus wind speed, for three different rotor diameters, with rotor 1 representing the largest diameter and rotor 3 the smallest diameter. As can be seen, increasing the rotor diameter at low wind speeds results in greater power capture at those speeds. In addition, it can be seen that at high wind speeds, smaller diameter rotors can produce more power while staying under the torque constraint for the reason that they are able to rotate faster while remaining under tip speed constraints. Points A, B, and C represent the wind speeds at which rotors 1, 2, and 3 first produce the single value of torque (or thrust, power, tip speed, blade or tower top bending, or some other limiting load) which limits the turbine capability. Therefore, one goal of this invention is to reduce and extend the radius of the rotor within the wind range bounded by points A and C, as shown in FIG. 3. At wind speeds greater than point C, the turbine relies on rotor blade feathering or on use of stall-regulated rotor blades to remain in operation at loads below the rated constraints.

The present invention comprises a method of controlling a variable diameter rotor used in power generation equipment driven by slow moving fluids such as wind and water. The invention allows the rotor to yield significant increases in power capture through increase of its swept area, without any penalty in rotor torque or thrust loads delivered to the powertrain or the connected structures. This method is applicable to rotors either having blades that feather or having stall regulated airfoils.

Figure 4:
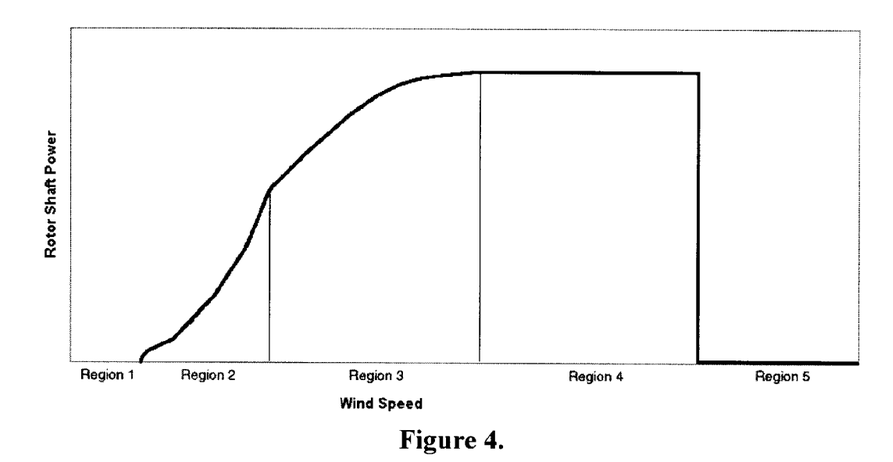
FIG. 4 illustrates the five turbine operating regions of the present invention.

In describing the method of operation of the rotor, it is simplest to separate the extendable rotor state into five distinct operating regions of flow speed, as shown in FIG. 4. Region 1 spans low velocities below turbine cut-in; Region 2 spans transition velocities during which the rotor diameter is maximum, rotor speed may vary, and power increases steadily with increasing wind speed; Region 3 spans higher velocities during which the rotor radius and speed are varied to limit loads while power production continues to increase; Region 4 spans very high velocities, at which the turbine produces approximately constant power and torque, using temporal rotor speed increases and blade pitch modulation; Region 5 spans extreme velocities during which the turbine cuts out, feathering its rotor blades to halt rotation and reduce loads. For comparison, these operating ranges are discussed relative to the fixed diameter rotor whose power curve is shown in FIG. 2 as rotor 2 for an extendable rotor system whose diameter may vary between the extended diameter of rotor 1 and the retracted diameter of rotor 3. For example, rotor 2 may represent the 50 m diameter rotor common to a 750 kW wind turbine, while rotor 1 and 3 may describe a rotor at the limits of blade extension and retraction such as 65 m fully extended and 35 m fully retracted, while operating under the same loads constraints present in rotor 2. A flowchart of turbine operation within and between Regions 1, 2, 3, 4, and 5 is illustrated in FIGS. 5, 6, 7, 8, and 9, respectively.

Region 1

Figure 5:
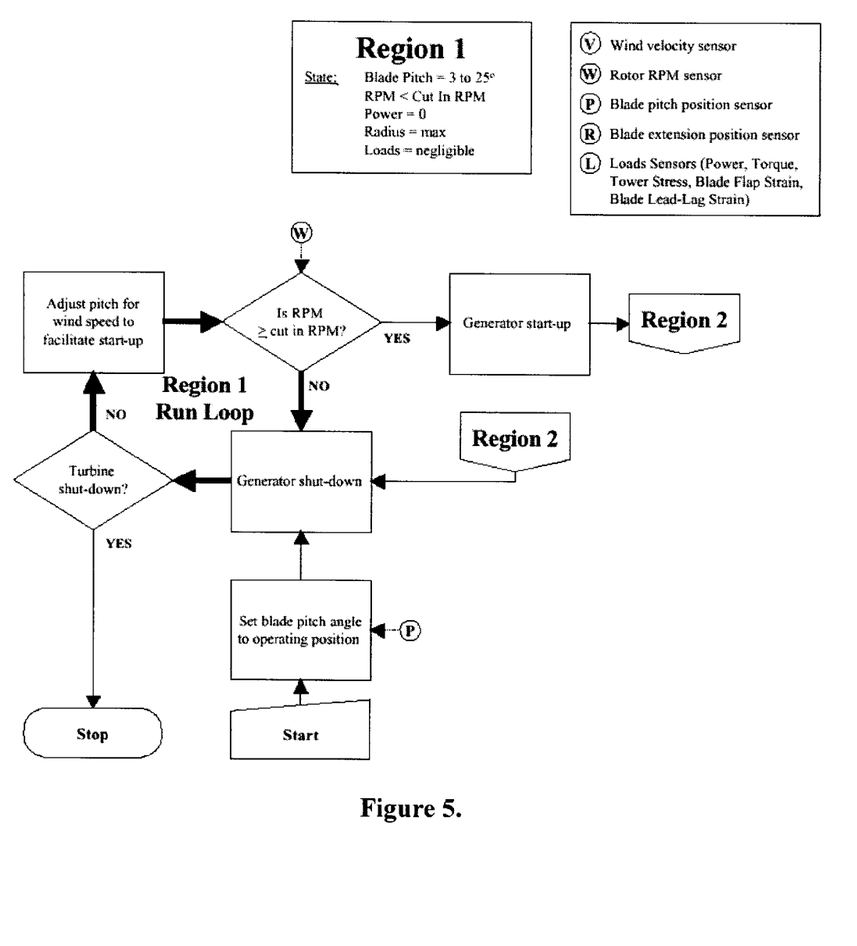
FIG. 5 illustrates a simplified control process loop for system operation within Region 1.

In very low velocities, the wind does not contain enough energy to allow the turbine to overcome its own losses. Therefore, the generator(s) are typically shut down, providing no reactive resistance to rotor rotation. Generally, the rotor blades are controlled to be at their optimal pitch for power capture in low winds, and the rotor extension is left at maximum radius. As shown in FIG. 5, when the rotor speed increases beyond a cut-in value, due to increasing wind speeds, the generator engages and the turbine transitions into Region 2.

Region 2

In low (or transition) velocities, the rotor blades are fully extended, enabling capture of significantly more power. This flow state extends from the rotor cut-in speed (the flow velocity below which the turbine is shut down) to the point at which the limiting system load (e.g., torque, thrust, rotor tip speed, blade or tower top bending) is reached.

Due to blade aerodynamics, wind turbine rotors generally produce maximum power capture efficiencies ($C_p$) at a fixed rotor tip speed ratio (rotor tip speed/free stream velocity). For low wind speeds, variable speed turbines alter their rotational rates with the wind speed to maintain maximum power capture efficiency, and thus, maximum power production, as given in Equation 4. In this variable speed range, the power production increases very nearly as the radius squared times the velocity cubed ($r^2$ $v^3$), with only slight variation in $C_p$. Because torque is calculated as the power divided by the rate of rotation (as in Eq. 1), it can be seen that torque increases as the rotor radius cubed times the flow velocity squared ($r^3$ $v^2$). In addition, thrust loads vary as the swept area times the velocity squared ($r^2v^2$). Therefore, as velocities increase for a fixed-radius rotor, the torque and thrust loads that are transferred to the generating equipment increase quadratically. As flow velocities increase, the rate of rotation of the blades increases linearly, until the maximum tip speed, $V_{tip}$, is reached.

Figure 6:
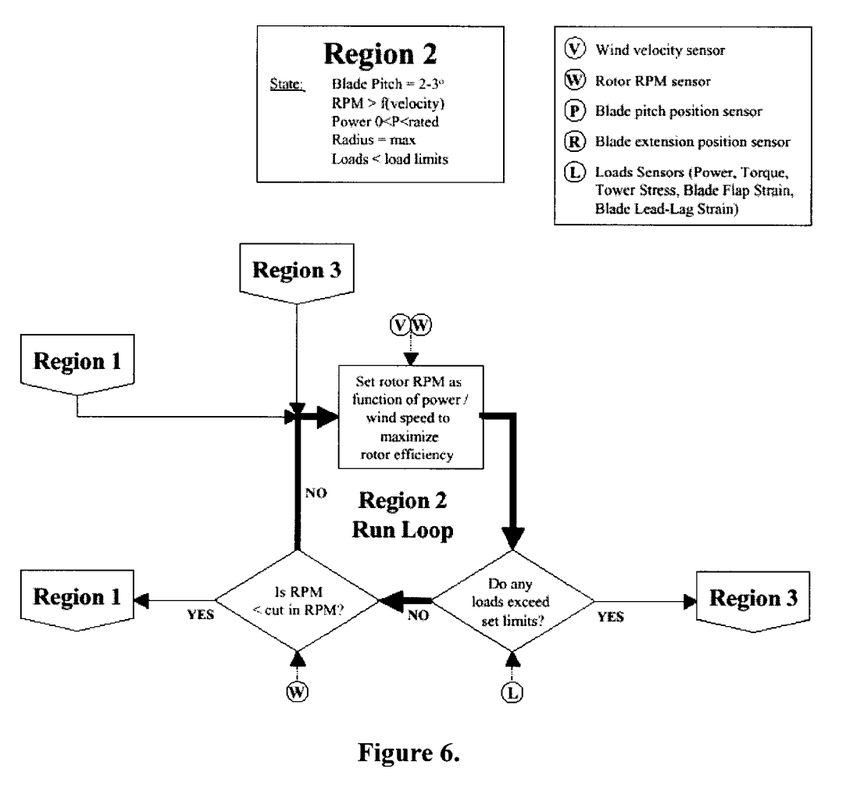
FIG. 6 illustrates a simplified control process loop for system operation within Region 2.

FIG. 6 shows that while in Region 2, the turbine monitors wind speed, rotor speed, and an assortment of load through sensors. As the wind speed (and the associated rotor power capture) varies, the control system varies the rotor speed to optimize power capture while staying below tip speed limits. If the wind speed and RPM fall below cut-in values, the turbine returns to Region 1 operation. If the any of the sensors exceed limits, the turbine transitions to Region 3 operation.

Generally, the velocity at which the limiting tip speed is reached may be less than the velocity where the limiting load (e.g., torque, thrust, blade or tower top bending) is reached. In this case, there is a small velocity range in which the rotors are fully extended and in which the rotational speed does not increase. Alternatively, in some instances such as offshore wind installations where blade acoustics are not as significant, the tip speeds may be allowed to increase, maintaining more optimal power capture efficiency over this range. Because the rotational speed and power capture change, the wind speed at which rated torque is reached may be slightly higher or lower in these instances.

Region 3

When the rated load is reached, for example at velocity A for extended rotor 1 shown in FIG. 2, the load is identical to that produced by the nominal fixed diameter (or semi-retracted) rotor 2 at velocity B and that produced by fully retracted rotor 3 at velocity C.

Therefore, as the velocity increases into the middle range, the rotor extensions are gradually retracted, holding fixed the limiting load delivered by the rotor. In so doing, the diameter of the rotor is determined as given in Equations 5 and 6 or 8, and the power curve approximately follows the path shown in FIG. 3. In addition, as the rotor diameter is reduced, the rotor RPM increases while maintaining rotor blade tip speeds below the limit. Because the extendable rotor system shown can reduce its diameter below that of the baseline fixed diameter blade of rotor 2, it can rotate at higher speeds. Because it can rotate at higher speeds, it has a higher peak power output while maintaining loads (especially torque) within preset constraints.

Figure 7:
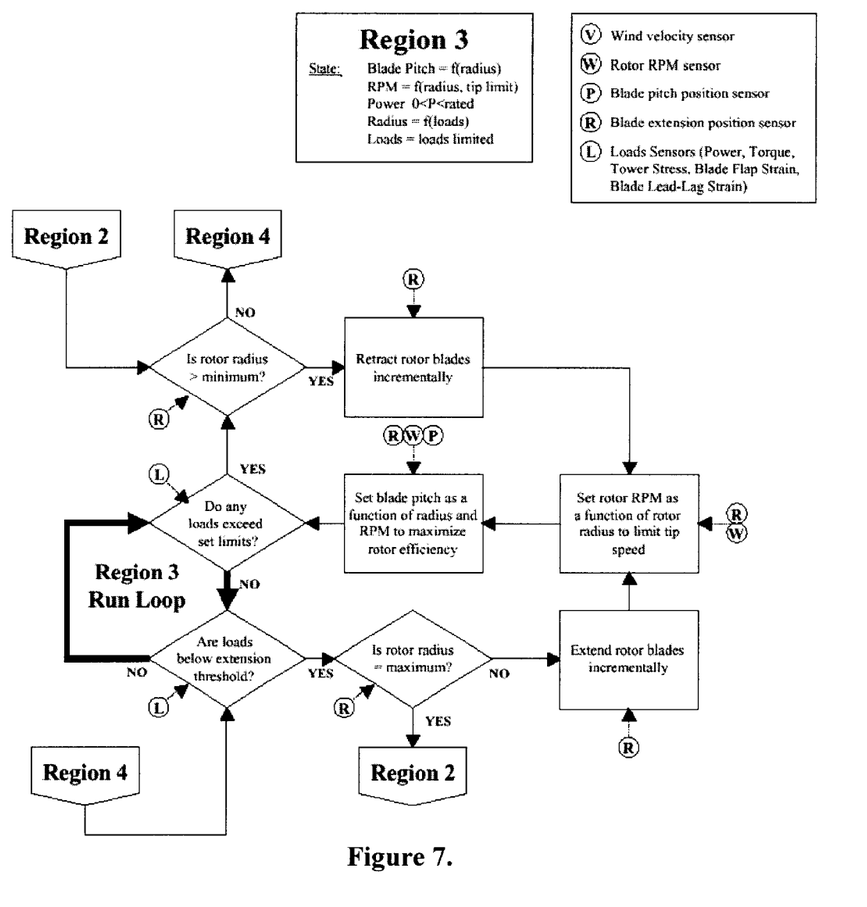
FIG. 7 illustrates a simplified control process loop for system operation within Region 3.

As can be seen in FIG. 7, operating Region 3 is entered from Region 2 because a load limit is violated or is about to be violated. The control system first checks the rotor position (via a sensor) to ensure that the rotor is not fully retracted. If the rotor is fully retracted, the turbine transitions to Region 4 operation. If it is not, the blade extension is incrementally retracted and the RPM and blade pitch are adjusted to optimize power productivity while monitoring rotor speed, blade pitch, extension position, and critical loads. The turbine controller checks load sensors, and can either repeat these steps or enter Region 3's main run loop, which holds systems static so long as the loads limits are not exceeded through either an upper or lower limit. If loads are too high, the controller re-examines and executes blade retraction. If loads are too low, the turbine attempts to extend the rotor blades in order to maximize power capture. One way to enact control hysteresis is to set differences between loads limits for blade extension and retraction. If, before extending the blades, the controller determines that the rotor is already fully extended, the turbine transitions back to operating Region 2.

It is significant to note that the schedules or control instructions dictating how the rotor is retracted as a function of wind speed may be varied for the same rotor blade system, allowing different peak torque and power load criteria to be used. Through use of this method of control, the same extendable rotor blade system may be installed on a variety of different onshore or offshore wind turbine or ocean current turbine designs, each of which has its own engineering design constraints.

The end of this flow regime occurs when the system has reached rated power, as determined by the point at which the blade is fully retracted and the retraction loads limits are reached.

Region 4

In flow velocities above those needed to reach rated power, power is limited by the rotor control method such that power production, rotational speed, and therefore torque load are all varying slightly around a constant value. For prolonged operation, this is done by either (a) feathering, or rotating the blades along their longitudinal axes, reducing their lift coefficients and their power capture efficiencies, or (b) stall regulation, wherein rotor blades aerodynamically stall when velocities exceed a specific value, reducing power capture efficiency significantly and thereby limiting or reducing associated loads. For short periods, the rotor speed can be allowed to increase roughly 10%, accepting gust energy and translating it into rotational inertia as opposed to torque, which can damage system components. Typically, the gusts will subside in a short period of time, and the power spike can be slowly captured by the turbine as it returns the rotor to the desired slower speed. In practice, the controller always seeks to hold rotor speed constant, but delays implicit in the controller and in the pitch actuator system allow the small speed variability around the desired value.

Figure 8:
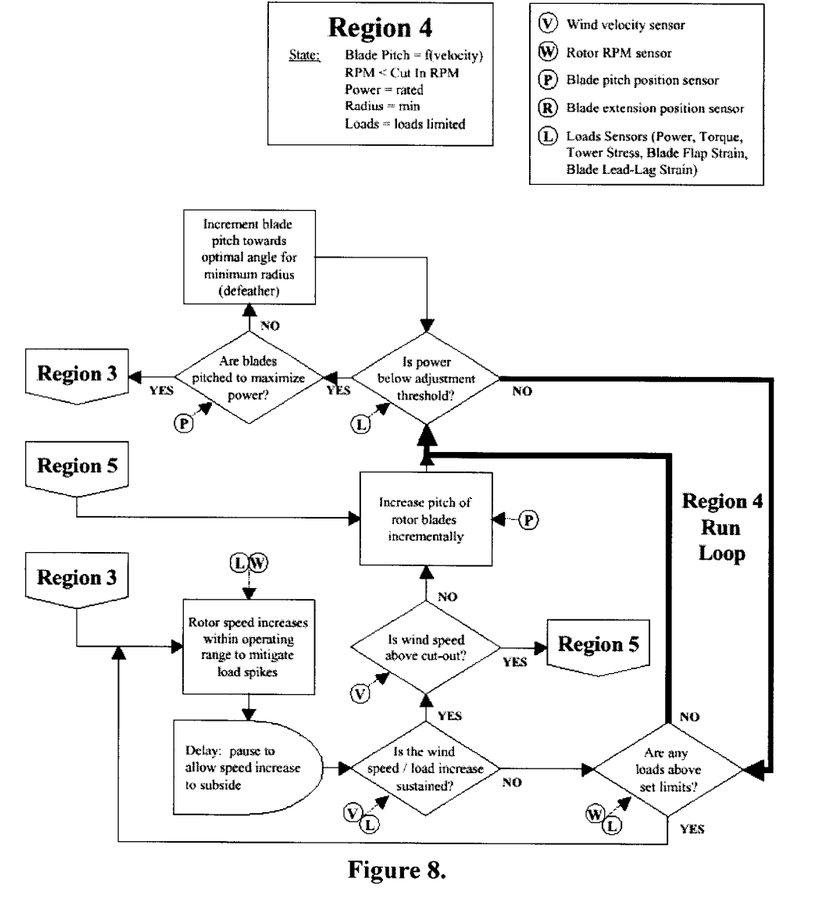
FIG. 8 illustrates a simplified control process loop for system operation within Region 4; and, FIG. 9 illustrates a simplified control process loop for system operation within Region 5.

As is shown in FIG. 8, Region 4 is entered from Region 3 because loads limits are being exceeded and no further blade retraction is possible. While monitoring rotor speed and loads, the rotor speed increases, or flywheels, to absorb gust loads. If the wind is not sustained, the turbine enters its main Region 4 run loop, maintaining torque and power between upper and lower limits. However, if the loads persist beyond a certain time limit, rotor blades are feathered incrementally to off-load power, and the turbine enters the Region 4 run loop. If wind speeds sensors indicate that velocities are extreme, the turbine transitions into operating Region 5, cut-out, by continuing to feather its blades. While in the run-loop, the turbine assesses whether power and torque dip below rated, and if so, it attempts to de-feather the rotor blades to increase rotor power capture efficiency. If the rotor blades are optimally pitched and the power and torque are still too low, the turbine returns to operating Region 3.

Region 5

When the velocities exceed a set extreme condition, the rotor blades completely feather or a brake is applied, stopping rotation and power production altogether in order to protect equipment from extreme load conditions that may occur in these velocities.

Figure 9:
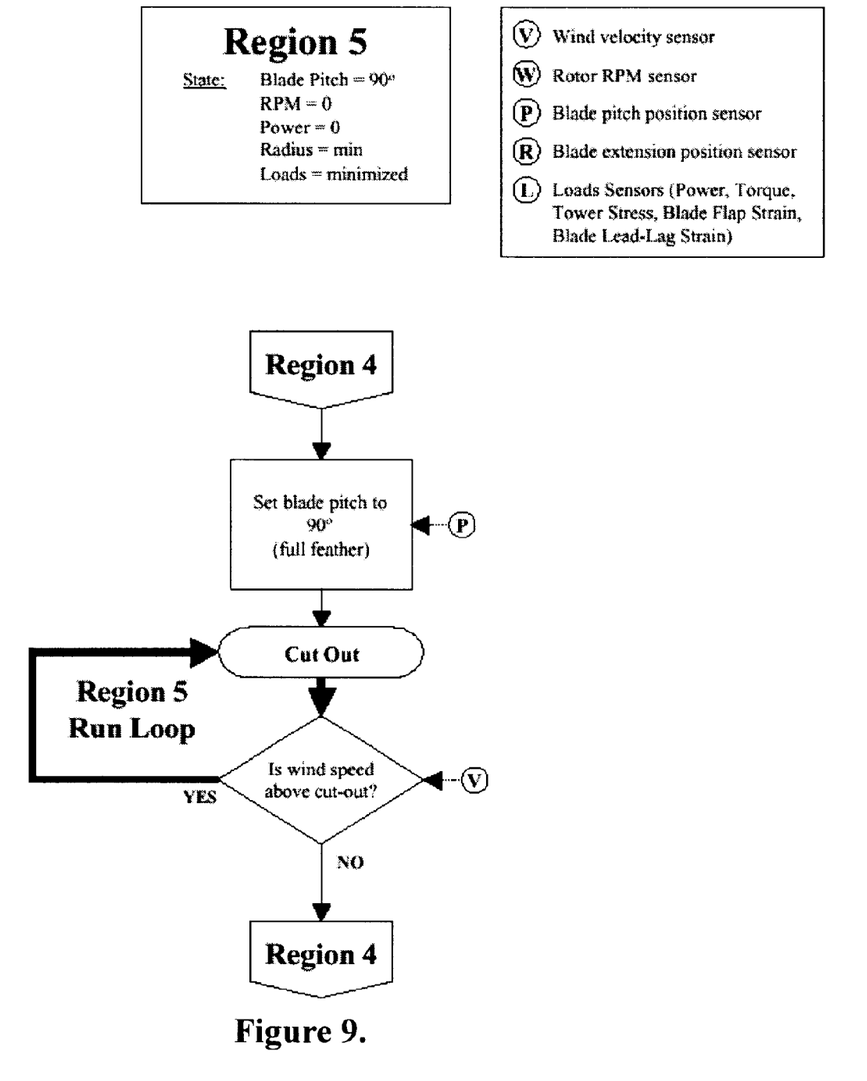

FIG. 9 illustrates that upon entry into Region 5, the rotor feathers its blades to halt rotation. Once the wind speed falls below a threshold value, the turbine returns to operation in Region 4.

Control Approach

The novel controls to be applied to the extendable rotor make use of three degrees of freedom: variable blade pitch, power control allowing variable rate of rotation of the rotor, and variable rotor blade length. By combining these three parameters, an array of loads and power provided to the turbine can be limited. For example, for short time cycle changes (<1–2 sec), it may be preferable to control blade rotational rate (and thereby power and torque) using power electronics. This does not generally eliminate the load increase, but rather levels out load spikes, reducing the impact of gust or surge variation. For larger time cycles, or velocity changes measured over seconds to tens of seconds or longer, the blade retraction method may be preferable. As a third parameter which may also act on this slower time scale, rotor blade pitch allows power shedding at velocities that result in above-rated power production.

The blade retraction schedule, or the definition of the transition between these modes, may be modified due to control and flow requirements. For example, the blade extensions may be retracted before the rated load is reached. The blades may reach full retraction before full power is reached. The blade extensions may remain partially deployed beyond the velocity at which peak power is reached, instead combining variable pitch with the blade extension for power management. In addition, controls hysteresis may be implemented, as a part of which, for example, the rotor radius may follow one schedule during increasing velocities, and another in decreasing velocities. Hysteresis allows the rotor to operate for longer periods of time at a given set of turbine state parameters (e.g. rotor diameter, blade pitch, and rotor speed) between system actuation, generally reducing the number of actuator cycles and prolonging turbine life.

This control process may be improved by adding state control, in which the controller is coded with an assortment of state-space equations governing the operation of turbine systems, including but not limited to blade extensions, rotor blade pitch, and rotor rpm including variable speed control for total or partial conversion for any electrical generator. While state-space control is well known in the art [1,2], no discussion is found in the art of implementing state-space control of integrated turbine systems incorporating extendable rotor blades. This control strategy, as is the case for many other strategies, is based on continual assessment of the state of the turbine. In other words, constant (or periodic) quantification of a number of turbine state variables allows calculation of system responses, dynamically updating system behavior to operate within a specified control boundary. This control boundary may include definition of appropriate system hysteresis. This strategy may allow for broader combinations of individual control states, offering opportunity for increased control stability and for performance optimization. By fitting turbine components with sensors to measure state variables such as power, torque, thrust, bending, and rpm, the turbine may more accurately determine controls actuator commands, optimizing turbine performance. These sensors may include devices such as optical shaft encoders, strain gauges on blades, towers or other structures, generator current and voltage sensors, accelerometers, thermometers, and shaft torque transducers.

Alternatively, adaptive control may be implemented to operate within the loads constraints, using a set of empirical equations with gains that are periodically updated. This system uses a set of operating curves or matrices to determine what combinations of component states are acceptable and to control the system actuators to remain within these state combinations. As system states change, the responses implicit in these matrices are continuously examined and adapted to optimize operation towards specified goals. The systems may use a similar set of sensors to determine system state (e.g. rotor radius, blade pitch, rotor speed, torque, thrust, bending or wind speed), and control hysteresis may be implicit in that control gains may be altered differently as states vary in the positive and negative directions.

Look-up tables detailing combined system states (e.g. blade pitch, rotor diameter and rotor speed) as functions of one or more independent state variables (e.g. wind speed) or measured or calculated state variables (torque, thrust, bending, etc.) may also be used. Typically, these tables are designed to optimize a specific area of turbine performance. Although this method of control has been widely applied to turbines in the past, it has never been applied to a system incorporating extendable rotor blades, and therefore has not been applied with the goals of maximizing power production while limiting produced loads. Although not necessarily simple, it is possible to incorporate control hysteresis in these look up tables by providing different sets of state tables for positive and negative derivatives of independent state variables and by providing a method of transitioning between the tables as these derivatives pass through zero.

Proportional Integral Derivative control (PID) relies upon equations that combine terms for proportional response (the difference between a system state and a desired state multiplied by some gain), for integration of past system states, and for system rates of change. Independent states (wind speed, etc.) and measured or calculated states (torque, thrust, bending, etc.) may serve as the inputs for this control method. The methods by which these three terms are calculated may allow for control hysteresis. While PID is widely used in turbines, PID control of turbine systems containing extendable rotor blades, variable rotor speed, and variable rotor pitch is novel.

Other controls methods may be used to implement this process. These methods generally offer the opportunity to integrate control hysteresis that will allow for reduced actuator cycling in the turbines. These methods may include hybrid control, which may include control methods such as PID equations integrated into a larger set of state-space control equations.

Opportunity for Blade Design Modifications

The above control strategy enables several physical modifications to past extendable and non-extendable rotor designs. Principally, because the control behavior of this invention allows the blade to be retracted as a function of measured power at a given RPM, having optimal blade performance at in high velocities is not critical. The rotor may simply be retracted more slowly. A small penalty may be paid in this case because this means the rotor will be more extended in higher winds, reducing the rotational rate allowable under tip limitations. This will result in lower permissible power capture to remain within torque or thrust constraints, or increases of these constraints to accommodate the same power capture profile. This affords the opportunity for the rotor extensions to have minimal chord or twist variation or to not be twisted at all, enabling construction with lower-cost methods such as pulltrusion. The power capture efficiency remains high when the rotor is fully extended because the outer half of the rotor blade has minimal twist and chord variation under present designs.

While the invention has been particularly shown and described with reference to preferred embodiments thereof, it will be understood by those skilled in the art that the foregoing and other changes in form and detail may be made therein without departing from the scope of the invention.

What is claimed is:

1. A fluid-flow power generating system, characterized by:
   a turbine mounted on a structure that is held stationary with reference to a fluid flow;
   said turbine including a rotor with a blade, said turbine being positioned on said structure such that said rotor is in alignment with fluid flow direction: and,
   a rotor control which adjusts power capture and loading of said rotor through extension and retraction of a radius of sweep of said rotor blade to increase and decrease the cross-sectional area of fluid flow swept by said rotor; and,
   an electrical generator connected to said turbine for generating electrical energy.

2. The fluid-flow power generating system of claim 1 wherein said rotor control adjusts power output and loading of said rotor through rotation of said blade about a longitudinal axis of said blade.

3. The fluid-flow power generating system of claim 1 wherein said rotor control limits power output and loading of said rotor through use of stall-regulated airfoils.

4. The fluid-flow power generating system of claim 1 wherein said rotor control adjusts power output and loading of said rotor through variation of rotational velocity of said rotor.

5. A method of controlling a variable radius rotor used for capturing power from a fluid flow turbine comprising:
   establishing points A, B, and C on power curves for operating ranges of said turbine relative to a fixed diameter rotor, a power curve of said fixed diameter rotor being rotor 2; and for a variable radius rotor, a diameter of said variable radius rotor capable of being varied between an extended diameter of rotor 1 and a retracted diameter of rotor 3,
   said points A, B, and C representing wind speeds at which said rotors 1, 2, and 3 first produce a value of at least one of a limiting load including torque, thrust, power, tip speed, blade and tower top bending, which limit turbine capability;
   said point A corresponding to a wind speed at which said rotor 1 first produces a value of limiting load, as defined by rotor 2;
   said point C corresponding to a wind speed at which said rotor 3 first produces a value of limiting load, as defined by rotor 2; and,
   retracting and extending the radius of said variable radius rotor within a wind range bounded by said points A and C.

6. The method of claim 5 wherein said rotor includes an extendable rotor blade and a rotor radius of said extendable rotor blade is controlled such that, in all flow velocities below a flow velocity required to reach rated power, said rotor blade is extended to a maximum diameter permissible to remain within load limits, such limits being at least one of limitations on (1) rotor thrust, (2) blade bending stress, (3) blade lead-lag bending, (4) flap bending, and (5) shaft torque.

7. The method of claim 6 wherein said load limits change as said rotor radius is increased or decreased, allowing for controls hysteresis.

8. The method of claim 5 wherein said rotor includes an extendable rotor blade and a rotational rate of said rotor is limited by a maximum blade tip velocity, and wherein said rotational rate is allowed to vary as said rotor radius increases and decreases such that tip speed of said rotor blade remains below a maximum blade tip velocity.

9. The method of claim 5 wherein said rotor includes a variable pitch extendable rotor blade and as the radius of said extendable rotor blade is increased or decreased, said pitch of said rotor is adjusted such that, as said rotor pitch is incrementally increased, power capture by said rotor is decreased.

10. The method of claim 5 wherein said rotor includes an extendable rotor blade and at wind speeds greater than point C said rotor radius is held at its minimum radius.

11. The method of claim 10 wherein at wind speeds greater than point C rotor blade feathering is invoked to keep said turbine in operation at constant power level.

12. The method of claim 10 wherein at wind speeds greater than point C stall regulated airfoils in said rotor blades are invoked to keep said turbine in operation at constant power level.

13. The method of claim 5 wherein a control system governs said variable rotor radius, the pitch of said rotor blades, and the rotational rate of said rotor, such that:
   in low flow velocities, in order to maximize power production, said rotor radius is set to its maximum value, said blade pitch is held fixed or varied slightly, and said rotational rate is allowed to vary;
   in flow velocities above the flow velocity at which the maximum rotor blade tip speed is reached but below the flow velocity at which load limits are reached, said rotor radius is set to its maximum value, said blade pitch is held fixed or varied slightly, and said rotational rate is held fixed;
   in flow velocities above the flow velocity at which said load limits are reached but below the velocity at which rated system power is reached, said rotor radius is increased or decreased in concert with said rotor rotational velocity being decreased or increased and said rotor blade pitch being increased or decreased such that said rotor does not produce loads exceeding said load limits and such that said rotor would produce less power if the rotor blade pitch were to increase; in flow velocities above the flow velocity at which the rated power is reached, said rotor blade pitch is changed such that the power captured by said rotor does not exceed the rated power and the loads produced by said rotor do not exceed said load limits.

14. The method of claim 5 wherein a control system governs said variable rotor radius, the pitch of said rotor blades, and the rotational rate of said rotor, using a at least one of sensor inputs from the group comprising:
   measurement of power output;
   measurement of rotor rotational velocity;
   measurement of rotor torque;
   measurement of extendable rotor blade position;
   measurement of rotor blade pitch angle;
   measurement of rotor blade bending load; and,
   measurement of bending loads upon a support structure.

15. In a rotor system in which a control method controls said rotor system to operate within four regions, a first of said regions being at velocities below cut-in, a second of said regions being over a range of intermediate velocities which yield varying power production, a third of said regions being at higher velocities in which the turbines produce constant or slightly decreasing power in order to limit loads, and a fourth of said regions being at extremely high velocities in which the turbines cut-out, an improved control method characterized by:
   controlling said rotor system to operate within a fifth region in which rotor diameter is varied to maintain operation within a specified loads regime.

16. The improved control method of claim 15 wherein said specified loads regime is such that, in all flow velocities below a flow velocity required to reach rated power, said rotor diameter is extended to a maximum diameter permissible to remain within specified rotor load limits, such limits being at least one of limitations on rotor thrust and shaft torque.

17. The improved control method of claim 16 wherein said load limits change as said rotor radius is increased or decreased, allowing for controls hysteresis.

18. The method of claim 15 wherein said rotor includes an extendable rotor blade and rotational rate of said rotor is limited by a maximum blade tip velocity, and wherein said rotational rate is allowed to vary as said rotor radius increases and decreases such that tip speed of said rotor blade remains below a maximum blade tip velocity.

19. The method of claim 15 wherein said rotor includes a variable pitch extendable rotor blade and as the radius of said extendable rotor blade is increased or decreased, said pitch of said rotor is adjusted such that, as said rotor pitch is incrementally increased, power capture by said rotor is decreased.

20. The method of claim 15 wherein said rotor includes an extendable rotor blade and, at flow velocities equal to or above a flow velocity required to reach rated power, said rotor radius is held at its minimum radius.

21. The method of claim 20 wherein, at flow velocities equal to or above said flow velocity required to reach rated power, loads produced by said rotor are maintained below set limits by feathering said rotor blades.

22. The method of claim 20 wherein, at flow velocities equal to or above the flow velocity required to reach rated power, said loads produced by said rotor are maintained below set limits by use of stall regulated airfoils in said rotor blades.

23. The method of claim 15 wherein a control system governs said variable rotor radius, the pitch of said rotor blades, and the rotational rate of said rotor, such that in low flow velocities, in order to maximize power production, said rotor radius is set to its maximum value, said blade pitch is held fixed or varied slightly, and said rotational rate is allowed to vary;

in flow velocities above the flow velocity at which the maximum rotor blade tip speed is reached but below the flow velocity at which said load limits are reached, said rotor radius is set to its maximum value, said blade pitch is held fixed or varied slightly, and said rotational rate is held fixed;

in flow velocities above the flow velocity at which said load limits are reached but below the velocity at which rated system power is reached, said rotor radius is increased or decreased in concert with said rotor rotational velocity being decreased or increased and said rotor blade pitch being increased or decreased such that said rotor does not produce loads exceeding said load limits and such that said rotor would produce less power if the rotor blade pitch were to increase; and, in flow velocities above the flow velocity at which the rated power is reached, said rotor blade pitch is changed such that the power captured by said rotor does not exceed the rated power and the loads produced by said rotor do not exceed said load limits.

24. The method of claim 15 wherein a control system governs said variable rotor radius, the pitch of said rotor blades, and the rotational rate of said rotor, using at least one of sensor inputs from the group comprising:

measurement of power output;
measurement of rotor rotational velocity;
measurement of rotor torque;
measurement of extendable rotor blade position;
measurement of rotor blade pitch angle;
measurement of rotor blade bending load; and,
measurement of bending loads upon a support structure.

* * * * *